Nov. 24, 1964     H. BERGER     3,158,396
GLARE SHIELD ATTACHMENT FOR AUTOMOTIVE VEHICLES
Filed July 26, 1963
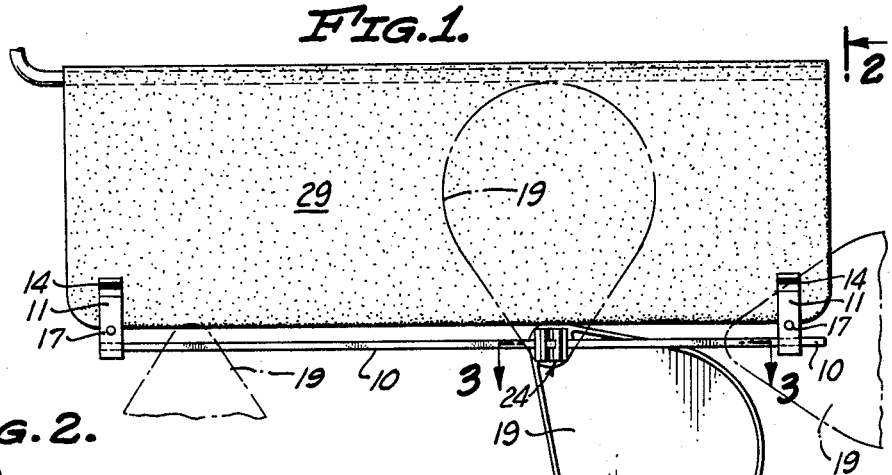
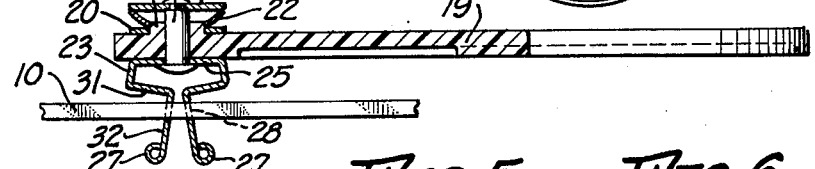
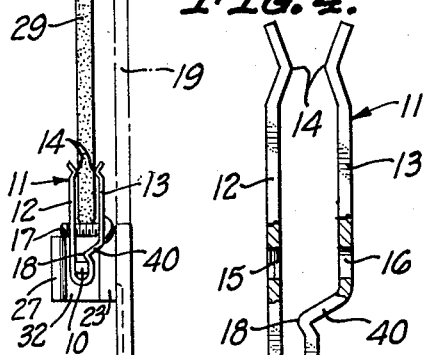
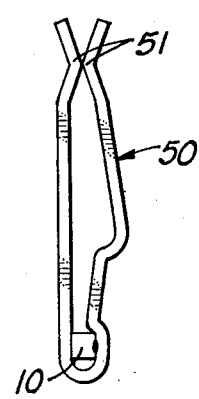
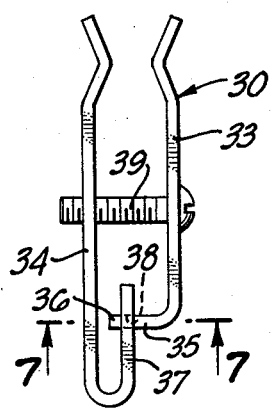
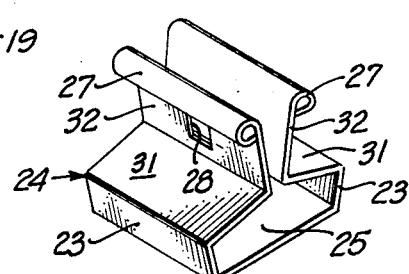
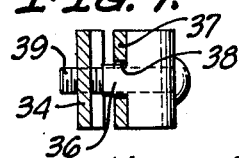
INVENTOR.
HANS BERGER
BY Robert C. Comstock
ATTORNEY United States Patent Office 3,158,396
Patented Nov. 24, 1964

3,158,396
GLARE SHIELD ATTACHMENT FOR
AUTOMOTIVE VEHICLES
Hans Berger, 17647 Belinda St., Encino, Calif.
Filed July 26, 1963, Ser. No. 297,880
6 Claims. (Cl. 296—97)

This invention relates to a glare shield attachment for the sun visors of automotive vehicles.

It is well known that the sun visors of automotive vehicles often do not offer the driver sufficient protection against the rays of the sun, particularly when such rays enter at such a low angle that they pass beneath or on either side of the sun visor and into the eyes of the driver, even when the visor is in lowered position. In such cases, the driver is partially or completely blinded by the sunlight or is forced to improvise protection by holding his hand or some available object before his eyes with one hand, while driving with the other. The same difficulty is also encountered by passengers as well as drivers.

It is accordingly the principal object of the present invention to provide a glare shield attachment which is adapted to be quickly and easily attached to the sun visor of an automotive vehicle and which is capable of being quickly, easily and retractably moved to any desired position beneath the lower edge or to either the right or left side of the sun visor in order to shield the eyes of the driver (or passenger).

It is a related object of the present invention to provide such a device which is extremely simple both in structure and in operation, so that it is easy to attach, easy to operate and is capable of being manufactured and sold in large quantities at a low price.

Another object of the invention is to provide a device of the class described which is efficient in its structure and operation.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of the invention.

Referring to the drawings, FIG. 1 is a front elevation view of an automobile sun visor in lowered position, showing my glare shield attachment in use;

FIG. 2 is a sectional view of the same, taken along line 2—2 of FIG. 1;

FIG. 3 in a sectional view of the same, taken along line 3—3 of FIG. 1;

FIG. 4 is a side elevational view, partly in section, of an attaching clip;

FIG. 5 is a side elevational view of an alternative form of attaching clip;

FIG. 6 is a side elevational view of another alternative form of attaching clip;

FIG. 7 is a sectional view taken on line 7—7 of FIG. 6;

FIG. 8 is an isometric view of the spring clip.

A preferred embodiment which has been selected to illustrate my invention comprises an elongated rod 10 having a square cross section. The rod 10 is preferably substantially equal or slightly shorter in length than the sun visor of an automotive vehicle. Removably attached to the opposite ends of the rod 10 are a pair of identically formed attaching clips 11, which are preferably formed of resilient material such as spring steel or other metal or plastic material having similar properties.

One embodiment of the attaching clips 11, which is shown in FIGS. 1, 2 and 4 of the drawings, is substantially U-shaped and includes a pair of bars 12 and 13, which extend substantially parallel to each other. The free ends of the bars 12 and 13 are bent to form a pair of inwardly directed V-shaped clamps 14. The inwardly directed oppositely disposed surfaces of the clamps 14 are preferably somewhat rounded and are adapted to engage the opposite sides of the sun visor 29 of an automotive vehicle.

The bar 12 is provided with a circular opening 15, which is internally screw threaded. A suitable alternative construction may be used in which the material forming the bar 12 is struck or formed to provide projections which act in a manner similar to screw threading in removably engaging a screw threaded fastening member.

The bar 13 is provided with a circular opening 16, which is aligned with the opening 15 in the bar 12. A bolt 17 or other suitable externally screw threaded fastening member is mounted with its head bearing against the bottom of the bar 13, with the upper portion of its shank extending through the opening 16 and its screw threaded end engaging the screw threading of the opening 15.

The bar 13 is provided adjacent its closed end with a jog 40 which brings the closed ends of the bars 12 and 13 closer together than their free ends. A hump 18 is formed at the end of the jog 40. The hump 18 acts to define one side of a rod receiving channel at the closed end of the attaching clip 11. This rod receiving channel is defined by the closed end of the clip 11, the adjacent portions of the bars 12 and 13 and the hump 18.

My attachment may be quickly and easily secured to the sun visor 29 of an automotive vehicle by placing the clips 11 in positions whereby the free ends of the bars 12 and 13 are disposed on opposite sides of the lower portion of the visor 29. The bottom edge of the visor 29 is then disposed adjacent to the bolts 17. The bolts 17 are then tightened until the clamps 14 securely engage the opposite sides of the visor 29. The tightening of the bolts 17 also moves the closed ends of the attaching clips 11 somewhat closer together, so that the bars 12 and 13 engage the sides of the rod 10 and prevent longitudinal movement of the clips 11 with respect to the rod 10.

A glare shield 19 is preferably formed of plastic or other suitable material which is either opaque or glare reducing. The shield 19 may be in tear-drop shape and may have a thickened edge portion extending around its periphery, as shown in the drawings. The upper end of the shield 19 is provided with an integral circular boss 41, around which fit a circular flat washer 20 and a circular spring washer 22. Another flat washer 21 fits adjacent the opposite side of the spring washer 22. A spring clip 24 has a flat base 25, which is disposed directly adjacent to the opposite side of the glare shield 19. A rivet 26 extends through all of the washers and the boss 41.

As best seen in FIGS. 3 and 8 of the drawings, the spring clip 24 has a pair of short sides 23, which extend at slightly more than a right angle from the base 25. Extending inwardly from the ends of the sides 23 are a pair of lateral portions 31, which are followed by a pair of slightly diverging portions 32, which terminate in rounded ends 27. The diverging portions 32 are both provided with substantially square openings 28, which are of slightly larger dimension than the cross section of the rod 10. The spring clip 24 is mounted on the rod 10 so that the rod 10 extends through the openings 28.

The spring clip 24 is preferably formed of spring steel or other suitable material and is so formed that the sides 26 normally extend at a slight angle in opposite directions with respect to the rod 10, so that the openings 28 are disposed at an angle with respect to the rod 10. The edges of the openings 28 accordingly engage the rod 10 and are held in engagement with it by the resilience of the clip 24. This normally prevents longitudinal movement of the spring clip 24 along the rod 10.

When the free ends 27 of the sides 26 of the spring clip 24 are manually moved toward each other, the sides 26 are moved away from their normal angular positions into positions in which they extend substantially parallel to each other and substantially transversely to the rod 10. The openings 28 are accordingly directed substantially transversely to the rod 10 and are sufficiently large so that their sides no longer engage the rod 10. The spring clip 24 can then be slidably moved along the rod 10 to any desired position. As soon as the manual pressure on the free ends 27 of the clip 24 is released, the sides 26 return to their normal positions due to their inherent resilience and the sides of the openings 28 again engage the rod 10 to hold the clip 24 against further movement with respect to the rod 10.

It is accordingly possible for the user to move the spring clip 24 and the attached glare shield 19 to any desired position along the entire length of the rod 10 between the attaching clips 11.

The glare shield 19 is also adapted to be rotatably moved between a retracted position in which it overlies the sun visor 19 and an extended position in which it extends downwardly from the lower edge of the visor 29. The glare shield 19 can also be moved to any desired intermediate position therebetween. The spring washer 22 provides frictional engagement which normally acts to hold the glare shield 19 at any position or angle to which it is moved. This pressure is easily overcome by manual movement of the glare shield 19, but after release of the manual pressure, the spring washer 22 will again hold the glare shield 19 in any desired position to which it has been moved.

If desired, one of the attaching clips 11 may be welded, soldered or otherwise secured to the rod 10, as indicated on the left-hand side of FIG. 1 of the drawings. The right-hand clip 11 can then be moved laterally to whatever extent is necessary to adjust the attachment to the length of the visor 29.

In an alternative embodiment of attaching clip shown in FIG. 5 of the drawings, the clip 50 is formed similarly to the clip 11, but the openings and bolt are eliminated. One of the clips 50 may be welded or otherwise secured to the rod 10. The other clip 50 may be left free for movement along the rod 10. The clip 50 is sufficiently resilient so that its clamps 51 securely engage the visor.

An alternative embodiment of attaching clip is shown in FIGS. 6 and 7 of the drawings. This form of clip is particularly adapted for use in mounting my device on a visor which is thicker than normal. It comprises a clip 30 which is formed of two parts rather than one. It includes a bar 34 having a screw threaded opening and a second bar 33 having an aligned opening. The bar 33 has a right angular end portion 35 with a boss 36. The bar 34 is looped to provide a short lower end 37 having an opening 38, which receives the boss 36 of the bar 33. A bolt 39 extends through the openings in the bars 33 and 34.

I claim:

1. A glare shield attachment for the sun visor of an automotive vehicle comprising an elongated rod substantially equal in length to the visor, said rod having a substantially square cross-section, a pair of attaching clips disposed adjacent to the opposite ends of said rod, each of said attaching clips including a pair of integral substantially U-shaped bars extending substantially parallel to each other, said bars having adjacent their free ends a pair of inwardly directed integral clamps adapted to removably engage the opposite sides of the visor adjacent the lower edge thereof, each of said clips having adjacent its closed end a substantially four-sided rod receiving channel, said rod being held within said channel, a spring clip mounted for sliding longitudinal movement along said rod between said attaching clips, said spring clip including a pair of resilient sides normally extending at an angle with respect to said rod, said sides having aligned openings therein of somewhat larger dimension than the cross-section of said rod, said rod extending through said openings, the edges of said openings normally engaging said rod to prevent the longitudinal movement of said spring clip along said rod, said sides adapted to be moved toward each other to a more parallel position to permit the longitudinal movement of said spring clip along said rod, a glare shield having its upper end rotatably connected to said spring clip, and a spring washer engaging the upper end of said glare shield and a stationary part of said attachment to provide frictional engagement normally holding said glare shield in any angular position to which it is rotated, while permitting free manual rotation of said glare shield.

2. The structure described in claim 1, each of said clips having adjacent its midportion a pair of aligned openings, at least one of said openings having internal screw threading, a bolt extending through said openings and being screw threadably engaged with said internal screw threadings, each of said bars having an inwardly directed hump adjacent to the closed end of said clip, said hump cooperating with said bars and the closed end of said clip to form a four-sided rod receiving channel, said bolt adapted to be tightened to hold said attaching clips to said visor and to simultaneously hold said rod within said clips.

3. A glare shield attachment for the sun visor of an automotive vehicle comprising an elongated rod substantially equal in length to the visor, said rod having a substantially square cross-section, a pair of attaching clips disposed adjacent to the opposite ends of said rod, each of said attaching clips including a pair of substantially U-shaped bars extending substantially parallel to each other, the ends of said bars being adapted to engage the opposite sides of the visor adjacent the lower edge thereof, each of said clips having adjacent its closed end a rod receiving channel, said rod being held within said channel, means urging said bars towar deach other to hold said attaching clips to said visor and to simultneously hold said rod within said clips, a spring clip mounted for sliding longitudinal movement along said rod between said attaching clips, said spring clip including a pair of resilient sides normally extending at an angle with respect to said rod, said sides having aligned openings therein of somewhat larger dimension than the cross-section of said rod, said rod extending through said openings, the edges of said openings normally engaging said rod to prevent the longitudinal movement of said spring clip along said rod, said sides adapted to be moved toward each other to a more parallel position to permit the longitudinal movement of said spring clip along said rod, a glare shield having its upper end rotatably connected to said spring clip, and a spring washer engaging the upper end of said glare shield and a stationary part of said attachment to provide frictional engagement normally holding said glare shield in any angular position to which it is rotated, while permitting free manual rotation of said glare shield.

4. A glare shield attachment for the sun visor of an automotive vehicle comprising an elongated rod substantially equal in length to the visor, a pair of attaching clips disposed adjacent to the opposite ends of said rod, each of said attaching clips including a pair of substantially U-shaped bars extending substantially parallel to each other, the ends of said bars being adapted to engage the opposite sides of the visor adjacent the lower edge thereof, each of said clips having adjacent its closed end a rod receiving channel, said rod being held within said channel, a spring clip mounted for sliding longitudinal movement along said rod, said spring clip including means normally engaging said rod to prevent the longitudinal movement of said spring clip along said rod, said means being manually releasable to permit such movement, a glare shield having its upper end rotatably connected to said spring clip, and means for holding said glare shield in any angular position to which it is rotated, while permitting free manual rotation of said glare shield.

5. The structure described in claim 4, at least one of said attaching clips being longitudinally movable along said rod, and threaded fastening means extending between the bars of said movable attaching clip for moving said bars apart to permit longitudinal movement of said attaching clip along said rod and visor, and for moving said bars together to tighten the grip of said arms on said visor and simultaneously tighten the grip of said arms on said rod, to prevent the longitudinal movement of said clip with respect to said rod and visor.

6. In a glare shield attachment for the sun visor of an automotive vehicle, an elongated rod adapted to be secured to the visor, a spring clip mounted for sliding longitudinal movement along said rod, said spring clip including a pair of resilient sides normally extending at an angle with respect to said rod, said sides having aligned openings therein of somewhat larger dimension than the cross-section of said rod, said rod extending through said openings, the edges of said openings normally engaging said rod to prevent the longitudinal movement of said spring clip along said rod, said sides adapted to be moved toward each other to a more parallel position to permit the longitudinal movement of said spring clip along said rod, a glare shield having its upper end rotatably connected to said spring clip, and means acting upon the upper end of said glare shield to provide frictional engagement normally holding said glare shield in any angular position to which it is rotated, while permitting free manual rotation of said glare shield.

References Cited by the Examiner
UNITED STATES PATENTS

| | | | |
|---|---|---|---|
| 978,398 | 12/10 | Rischard | 24—81 |
| 2,894,576 | 7/59 | Williams | 296—97 |
| 2,921,813 | 1/60 | Lowry | 296—97 |
| 2,961,479 | 11/60 | Bertling | 248—295 |

A. HARRY LEVY, *Primary Examiner.*